United States Patent [19]

Walsh

[11] Patent Number: 4,738,349

[45] Date of Patent: Apr. 19, 1988

[54] AUTOMATIC SPRING FEEDING DEVICE

[75] Inventor: William H. Walsh, Marina del Rey, Calif.

[73] Assignee: The Gillette Company, Boston, Mass.

[21] Appl. No.: 912,073

[22] Filed: Sep. 25, 1986

Related U.S. Application Data

[62] Division of Ser. No. 683,914, Dec. 18, 1984, Pat. No. 4,638,653.

[51] Int. Cl.$^4$ .............................................. B65G 17/32
[52] U.S. Cl. ........................ 198/397; 198/690.1; 198/953; 53/148; 221/206; 221/254; 414/748
[58] Field of Search ............ 198/397, 443, 444, 690.1, 198/953; 72/129, 135, 371; 83/267, 279, 280, 411 R, 417, 907; 221/204, 205, 206, 254; 414/304, 305, 306, 331, 745, 748, 404, 406, 407, 408, 409; 53/148, 531

[56] References Cited

U.S. PATENT DOCUMENTS

| | | | |
|---|---|---|---|
| 3,238,825 | 3/1966 | Dearsley | 83/411 R |
| 3,318,128 | 5/1967 | Rhodes | 72/187 |
| 3,468,407 | 9/1969 | Fürst | 198/550.4 X |
| 3,613,911 | 10/1971 | Walchhuter | 414/331 |
| 3,850,289 | 11/1974 | Behr et al. | 198/577 X |
| 4,011,780 | 3/1977 | David | 83/907 X |
| 4,063,635 | 12/1977 | Heckel | 198/533 X |
| 4,081,069 | 3/1978 | Ono | 198/399 X |
| 4,319,861 | 3/1982 | Seragnoli | 198/857 X |
| 4,356,905 | 11/1982 | Large | 198/803.6 X |
| 4,360,095 | 11/1982 | Balwin et al. | 83/411 R X |
| 4,588,069 | 5/1986 | Sticht | 198/953 X |

FOREIGN PATENT DOCUMENTS 1091483  10/1960  Fed. Rep. of Germany ...... 198/443

Primary Examiner—Leslie J. Paperner
Assistant Examiner—Cheryl L. Gastineau
Attorney, Agent, or Firm—Poms, Smith, Lande & Rose

[57] ABSTRACT

An automatic spring feeding device is shown which uses a three-sided feedbox having a movable bottom panel for urging a series of springs into rotating bundles against a moving platen which forms the fourth side of the feedbox. The platen is grooved with specially shaped grooves which capture individual springs therein under the urging of a magnet on the opposite side of the platen from the springs. The platen is then carried by a continuous drive chain to a spring feed assembly where the springs are loaded one at a time into a channel from which the springs are metered by a solenoid operated release door. The key to handling the springs without tangling them is to wind each end of the spring with a closely wound coil. After the springs are placed upon a conveyor belt, the unwanted closely wound coil or coils may be removed by a suitable shear.

17 Claims, 5 Drawing Sheets

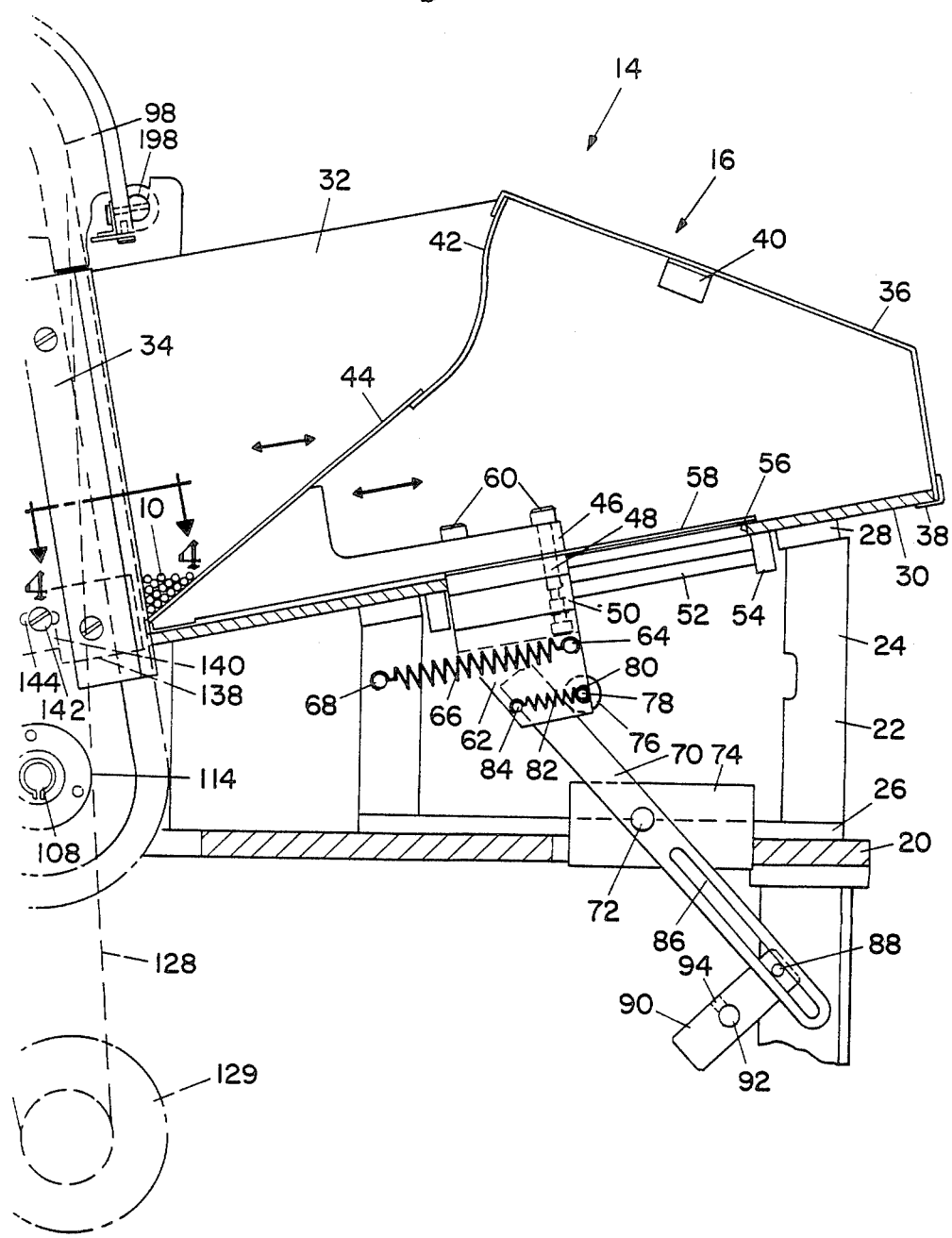

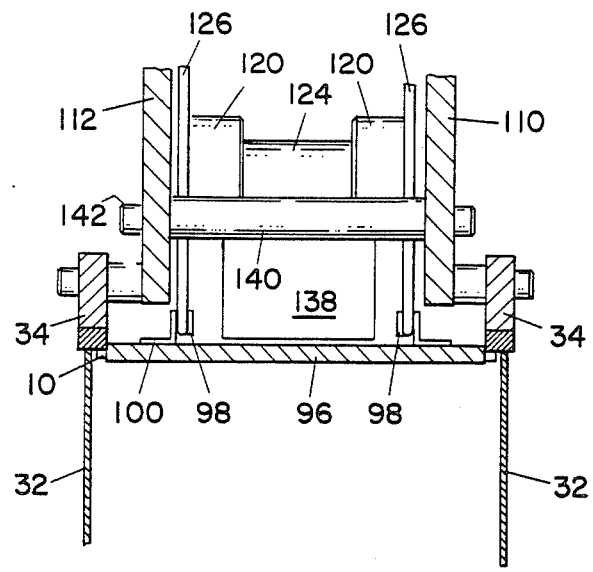
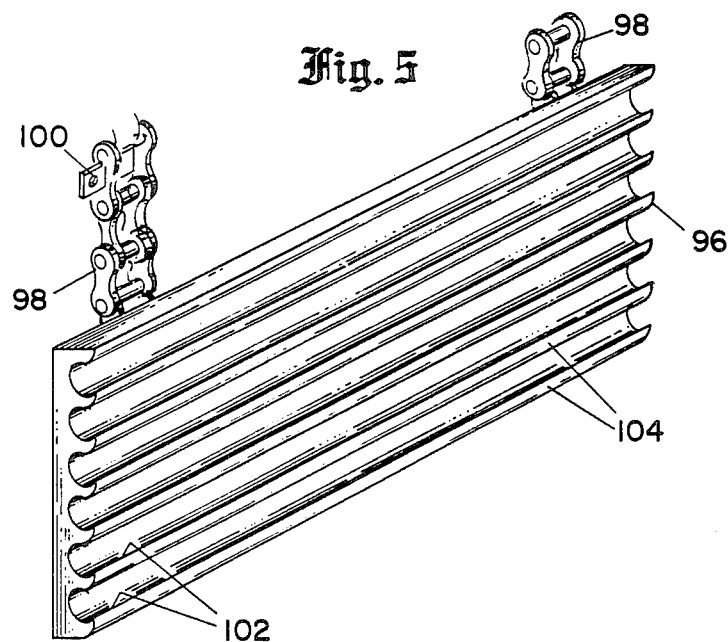

AUTOMATIC SPRING FEEDING DEVICE

This application is a division of application Ser. No. 683,914, filed Dec. 18, 1984, now U.S. Pat. No. 4,638,653.

FIELD OF THE INVENTION

The present invention relates to an automatic spring feeder and, more particularly, to a device which sorts a plurality of springs from a storage area and deposits them into a receptacle where they may be released one at a time upon a conveyor belt utilized in a fully automated assembly machine.

BACKGROUND OF THE INVENTION

It is well-known in the industry to provide a series of machines associated with a continuously moving conveyor belt to accomplish the automatic assembly of such commercial devices as automatic pencils and pens, razor and razor blade receptacles, containers for cosmetic and pharmaceutical substances, and the like. While such automatic assembly lines are well-known, it is also known that the handling of springs to be utilized within the device being assembled presents a special problem since springs have a tendency to become entangled with one another, thus inhibiting their automatic handling.

Accordingly, it is an object of the present invention to provide an automatic spring feeding device capable of handling a plurality of springs without tangling one spring with another.

Another object of the present invention is to provide an automatic spring feeding device which is capable of delivering a plurality of springs to a desired location at a desired spacing for use by an automatic assembly machine.

SUMMARY OF THE INVENTION

In accomplishing the foregoing objects, there is provided a feedbox which receives a plurality of springs that have been bundled into a collection of parallel springs whose ends are generally aligned. Each spring is especially adapted so that its ends are closed by closely wound coils. The feedbox itself is provided with four sides, only three of which are closed. The fourth, opened side is closed by a grooved platen which is moved across the opened side by a continuous driven chain. The bottom panel of the feedbox is oscillated to agitate the springs and push them against the grooved platen where they are urged into the grooves by the action of a permanent magnet. As a first platen exits the feedbox, it is replaced by a new platen which is, in turn, filled with a single spring in each groove.

The platen is carried by the continuous drive chain to a generally horizontal position where lift fingers remove the springs from the platen and permit them to fall under the pull of gravity into a spring receptacle. This spring receptacle contains the springs, piled one upon the other, under the control of a latching mechanism which releases one spring at a time onto a continuously moving conveyor chain. The release of the springs from the spring retainer is timed to coincide with the spacing on the conveyor chain so that the springs fall one at a time into appropriate notches within the conveyor. Thereafter, one or more of the spring ends having the closely wound coils may be sheared therefrom to ready the spring for the next assembly step.

The automatic spring feeding device described herein may be utilized in various applications, including a automatic assembly machine designed for assemblying a disposable pencil. As many devices which require a spring lend themselves to automatic assembly techniques, it will become apparent to those skilled in the art that the present invention may be utilized in many automatic assembly machines which require the delivery of a spring to a desired location at a desired spacing.

DESCRIPTION OF THE DRAWINGS

Other objects and advantages of the present invention will become apparent to those skilled in the art after review of the remaining portions of this specification and the accompanying drawings, wherein:

FIG. 4 is a cross-sectional view taken along lines 4—4 of FIG. 2;

FIG. 5 is a perspective view showing the moving platen of the present invention;

FIG. 7 is a mechanical schematic drawing showing the shearing station used within the present invention.

DESCRIPTION OF THE PREFERRED EMBODIMENT

Figure 1:
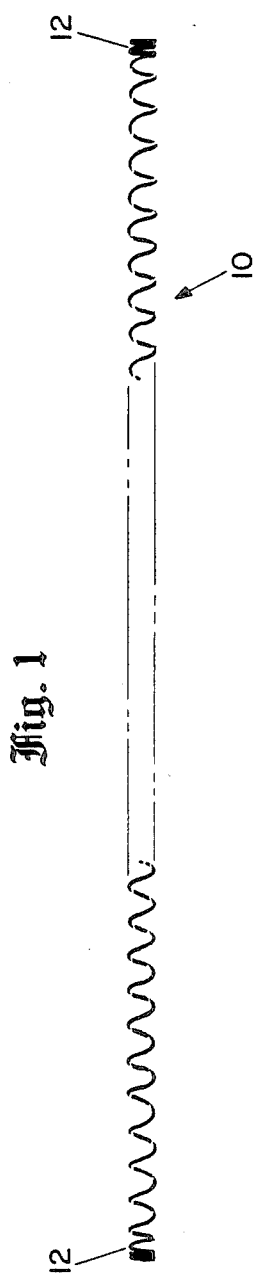
FIG. 1 is a side view of a spring utilized within the present invention.

Referring now to the drawings, FIG. 1 shows a spring 10 which may be a helically wound spring having a plurality of turns. Note, that each end 12 of the spring 10 has been closed by closely wound coils of three turns each to produce closed ends which prevent the ends of similar springs from entangling with one another. It will be understood that the size, shape and number of coils of the spring 10 shown in FIG. 1 may vary considerably. The important feature of the present invention is the closely wound coils that form the ends 12. If the particularly application for spring 10 does not require a closely wound end, these ends may be removed by a shear once the spring has been placed upon the conveyor chain, as will be described hereinbelow.

The springs may be manufactured in the normal way but should be stored in bundles of limited numbers such that the bundles are arranged with each spring parallel to the other and the ends generally aligned with one another. It has been found that the best way to retain these bundles after manufacture is to place them within polyurethane bags rather than wrapping a rubber band or other retaining mechanism around the bundle. The reason for this is that the bagging presents the springs from being compressed one against the other, thus raising the possibility of entangling the centers of the springs.

Figure 2:
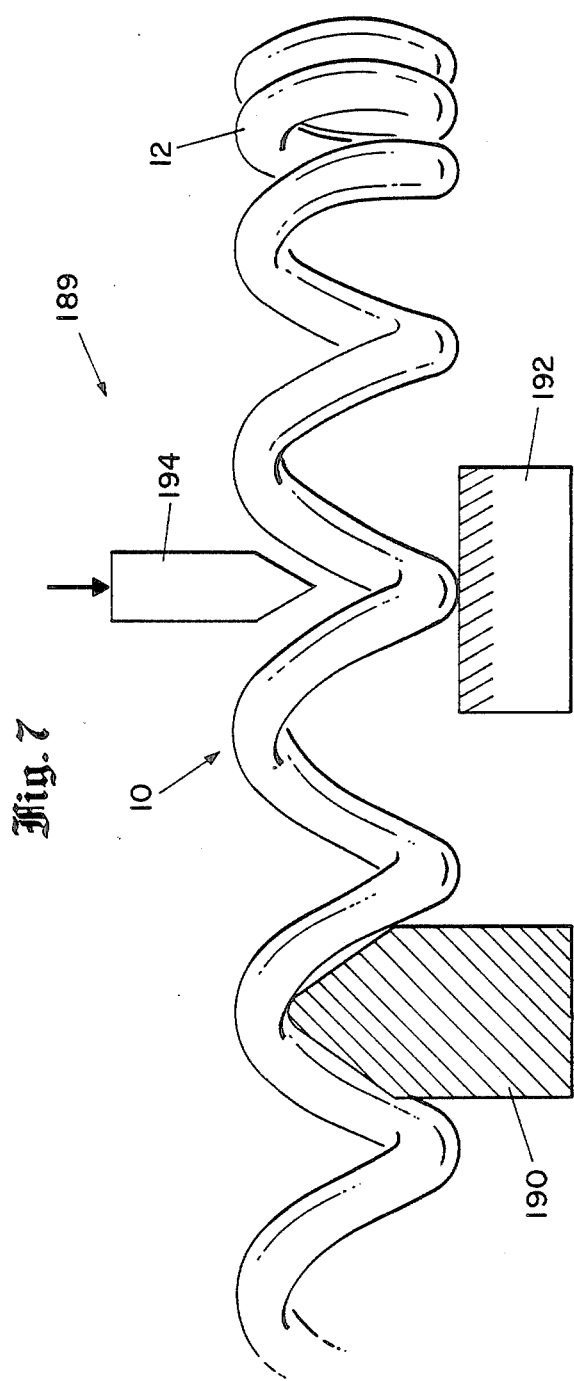
FIG. 2 is a side elevational view showing the feedbox and movable platens of the present invention.
Figure 6:
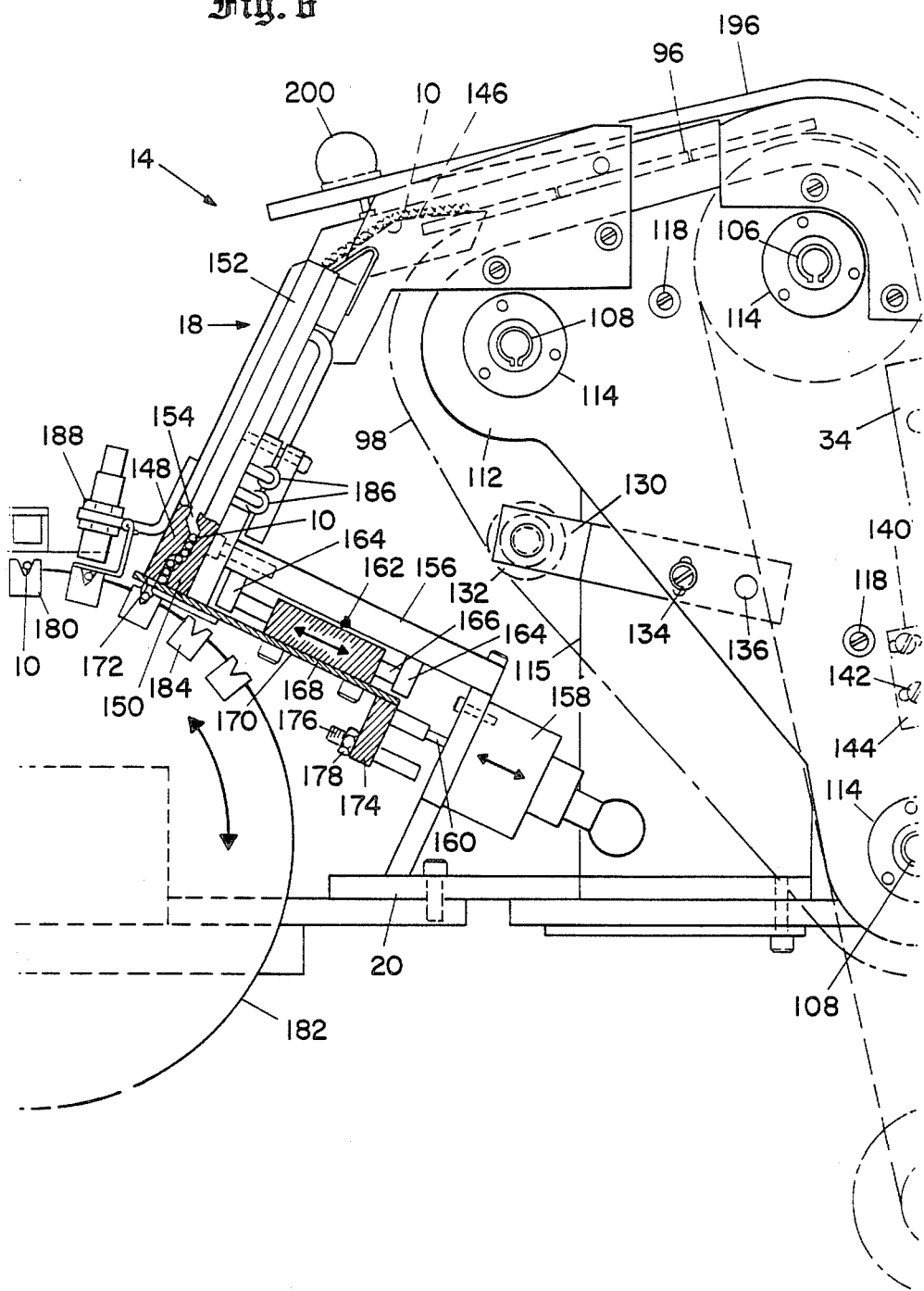
FIG. 6 is a side elevational view showing the spring receiving and spring feeding assembly of the present invention.

An automatic spring feeding device 14 is shown in partial cross section in FIGS. 2 and 6, wherein a spring sub-assembly 16 is shown generally in FIG. 2 and a spring receptacle and spring feed sub-assembly 18 is shown in FIG. 6. The feedbox assembly 16 is mounted upon a base plate 20 by a mounting bracket 22 which consists of four vertical legs 24 attached to a base plate 26 and cross-members 28, as by welding. Mounted, as by screws, to the cross-members 28, is a base tray 30 which is mounted at an angle of between ten and fifteen degrees to the plane formed by base plate 20. The feedbox assembly 16 is formed upon the base tray 30 by a pair of side walls 32 that connect to side wall mounting post 34. The third side of the spring feedbox is closed by a sheet metal end wall 36 which attaches to the tray 30 by bracket 38 and to the side walls 32 by brackets 40.

The upper end of wall 36 is bent at 90 degrees to form an angle which mounts a flexible sheet of elastomeric material 42 whose opposite end is connected to a bottom reciprocal panel 44 which closes the bottom of feedbox sub-assembly 16. Panel 44 is mounted upon an upper, angled surface of a mounting block 46 which mounts through a spacer block 48 to a sliding block 50. The resultant angle on the bottom of feedbox assembly 16 is between fifty to fifty-five degrees.

Block 50 slides upon a pair of precision ground shafts 52 mounted to the lower surface of tray 30 by mounting blocks 54. An aperture 56 is provided in the bottom of tray 30 to provide ample room for the motion of sliding block 50 and its associated mounting block 46. Located between the spacer 48 and block 46 is an aperture cover 58 which is retained by the compression of a pair of mounting screws 60 that also secure block 46 and spacer 48 to the sliding block 50.

Attached to the lower surface of sliding block 50, by screws, is a U-shaped bracket 62, only one end of which is shown in FIG. 2. The U-shaped bracket 62 is provided with a pin 64 which mounts an extension spring 66 connected to one of the vertical legs 24 of the base plate 20 by a second pin 68. Spring 66 serves to return the bracket 62 and sliding block 50 to the far left position shown in FIG. 2.

The bracket 62 and slide block 50 are urged to the right by a rotating arm 70 which mounts on a shouldered screw 72 secured within a mounting block 74 attached to the base plate 26 of bracket 22, as by welding. Arm 70 engages a spring loaded roller 76 whose longitudinal shaft 78 rides within a slot 80 in each vertical arm of the U-shaped bracket 62. Shaft 78 is retained within the slot 80 by the action of an extension spring 82 attached to a pin 84 that extends from the side wall of the brackets 62. The opposite end of arm 70 is slotted at 86 to receive a sliding pin 88 which extends from a rotating arm 90 that is attached to a shaft 92 by a set screw 94. The rotation of the arm 90, by a motor, not shown, causes the pin 88 to slide within slot 86 which causes the rotation of arm 70 about the shoulder screw 72 for displacing the bracket 62 back and forth along the shaft members 52. This, in turn, causes the bottom panel 44 within the feedbox assembly 16 to be reciprocated in an agitating motion which tends to push the spring 10 and rotate the bundles in which the springs are introduced into the feedbox toward a platen 96, best seen in Figs. 3, 4 and 5.

In the preferred embodiment, the platen is dimensioned 5" wide by 2¼" high and its constructed from a nonmagnetic material, such as alumininum which has been hard anodized. The platen 96 is mounted upon a pair of roller chains 98 having specially designed links which are formed with tabs 100 extending at right angles therefrom, see FIGS. 3, 4 and 5. Tabs 100 mount a plurality of platens 96 upon the continuous roller chain 98 which is passed along the left-hand surface of the feedbox 16 to close the fourth otherwise open side. It will be seen that the angle between the bottom panel 44 and platen 96 is less than ninety degrees or approximately sixty degrees.

Referring to FIG. 5, it will be seen that the platen 96 is designed with a plurality of grooves 102 which may be formed by milling a semi-circular shape across the full face of the platen 96. The lower surface of the semi-circular shape which forms groove 102 extends beyond the center line thereof so that a shelf with a slight upward taper is formed on the lower surface. The upper surface of the semi-circular shape which forms groove 102 is terminated before the center line thereof so that the upper surface encourages the entrance of a spring 10 into the groove 102. The surfaces 104 joining grooves 102 are formed at an angle to the plain of the platen 96 which, in the preferred embodiment, is flat and approximately 20 degrees.

Figure 3:
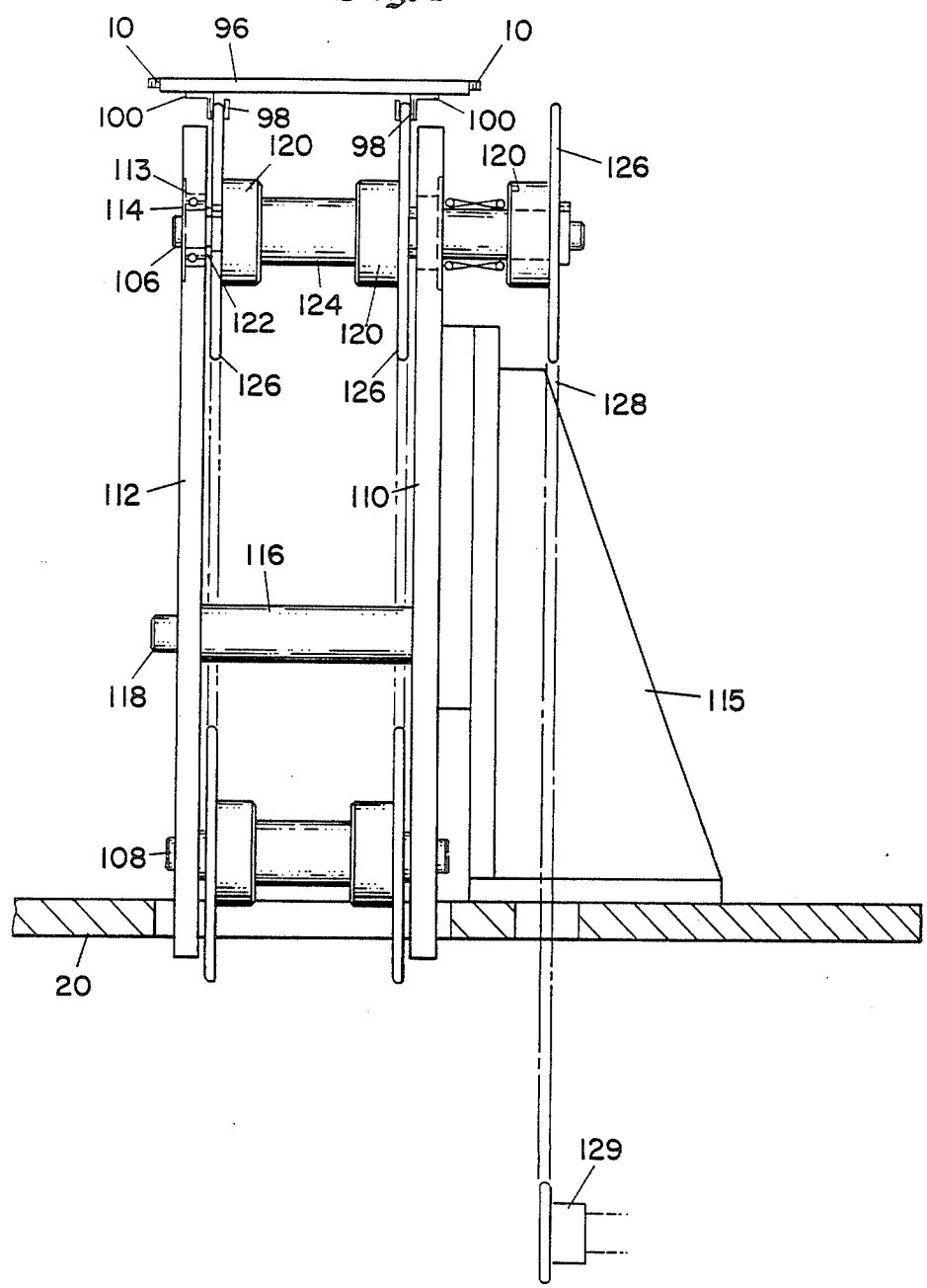
FIG. 3 is an end view of FIG. 2, showing a continuous drive chain which carries the platens.

The plurality of platens 96 are carried upon the continuous roller chains 98 about three rotating shafts including a drive shaft 106 and two driven shafts 108. As best seen in FIG. 3, the shafts 106 and 108 are rotatably supported between a pair of support plates 110 and 112 by ball bearings 113 which are retained in plates 110 and 112 by cover plates 114. Support plate 110 is attached to a bracket 115, as by welding, which, in turn, is attached to the base plate 20 by suitable bolts or welding. Plate 112 is spaced from and attached to plate 110 by supporting spacers 116 and bolts 118. Mounted upon each of the shafts 106 and 108 are a pair of sprocket hubs 120 which are spaced from the plates 110 and 112 by spacers 122 and spaced from each other by a centrally located spacer 124. Each hub 120 mounts a sprocket 126 which supports the roller chain 98. Driven shaft 106 extends beyond plate 110 to support a third sprocket hub 120 and sprocket 126 which is driven by a suitable chain 128 and drive motor 129.

As seen in FIG. 6, chain 98 is tensioned by an idler arm 130 which mounts a tensioning sprocket 132 and which is adjusted by loosening a screw 134 for rotating the arm 130 about a pivot pin 136.

As best seen in FIGS. 2 and 4, the springs 10 are drawn into the grooves 102 within platen 96 by the action of a permanent magnet 138 which mounts upon an adjustable bracket 140 that may be adjusted by loosening and tightening screws 142 to permit them to slide within slots 144. The magnet 138 generates a field through the nonmagnetic platen 96 for urging the springs 10 into grooves 102. Thereafter, the platen 96 is carried upwardly away from the bundle of springs 10 and out of the feedbox 16. As the platens 96 are mounted upon the roller chains 98 in a continuous edge to edge manner, the removal of one platen by the moving chain 98 does not interrupt the closure of the feedboxes 16.

As seen in FIG. 6, the chains 98 assume a generally horizontal position after they pass over the driven shaft 106. As the platens are carried to the left in FIG. 6, a pair of spring contacting fingers 146, engage the ends of springs 10 to lift them from the grooves 102 within platen 96. It may be seen in FIGS. 3 and 4 that the springs 10 are slightly longer than platen 96 to permit the fingers 146 to engage the springs. The springs are then carried by gravity and by the force of following springs across the surfaces of fingers 146 and into the spring receptacle assembly 18. The spring receptacle 18 includes a pair of plates 148 and 150 held together by side walls 152 in a spaced relationship just wider than the diameter of springs 10 to form a spring channel 154. The lower portion of plates 148 and 150 are offset to form turns in the spring receiving channel 154 which prevent the springs 10 from falling through that channel too rapidly as they are released therefrom.

Plate 150 is retained at an angle of approximately 65 degrees by an L-shaped bracket 156 which is attached, as by welding, to the base plate 20. Also mounted to the L-shaped bracket 156 is a solenoid 158 whose shaft 160 connects to a sliding spring receptacle closure assembly 162. The closure assembly 162 is formed by a pair of blocks 164 mounted to the lower surface of the L-shaped bracket 156. A pair of parallel shafts 166 mount within blocks 164 for mounting a sliding block 168 that supports a closure plate 170, having a longitudinal slot 172 which is normally offset from the channel 154 to prevent the escape of the stack of springs 10 piled one upon the other within the channel 154. Extending from closure plate 170 is a block 174 which receives the solenoid shaft 160, a threaded shaft 176 and a jam nut 178. Adjustment of the shaft and nut, 176 and 178, provides a limitation on the stroke generated by energizing the solenoid 158. Such adjustment assures that slot 172 is aligned with the channel 154 to permit a spring 10 to drop through the slot 172 onto a chain conveyor 180. The chain conveyor passes around a sprocket 182 and consists of a plurality of spring receiving links 184 joined in a conventional manner to form the chain 180. Note, that each of the links 184 is provided with a V-shaped notch which receive a spring 10.

Optical sensors 186 are provided within the channel 154 to sense a high and low spring setting. When the springs fall below the low setting, the machine is shut off and an indicator turned on to indicate the absence of springs. When the springs extend above the high indicator, the motor 129 which drives chain 128 and the continuous chains 98 is turned off to prevent the further delivery of springs 10 to the spring receptacle sub-assembly 18. A third optical sensor 188 is focused on the links 184 to sense the presence or absence of a spring within the notches of the links 184.

Referring now FIG. 7, a station 189 just beyond the point shown by the position of the optical sensor 188 provides for the shearing of the closely wound coil 12 or coils from spring 10. This operation is accomplished by raising a spring orienting guide 190 by pneumatic or hydraulic means. As the pointed tip of the spring guide adjusts the spring into the appropriate orientation, it will be noted that the spring coil over an anvil 192 is oriented so that it is hard against the anvil under a cutting edge 194. The cutter 194 is actuated by pneumatic or hydraulic means to lower the blade against the anvil 192 and shear the closely wound coils 12 from the spring 10.

While the automatic spring feeding device of the present invention has been described with a rather narrow and relatively long helically wound spring, it will be understood that the method and apparatus of this invention is capable of handling various springs having different lengths, diameters and numbers of coils. One important feature of the present invention is the closely wound coils that form ends 12 on spring 10 to prevent the ends from tangling. Another feature is the bundling of the spring 10 during their manufacture to prevent the springs from tangling at their mid-sections. Thereafter, the introduction of the springs into the feedbox 16 and the agitation created by the moving bottom panel 44 urges the springs into the slots 102 within the platen 96 that closes the fourth side of the feedbox 16. The moving platen 96 then carries the springs 10 in a predetermined spacing to the spring receptacle sub-assembly 18 where they are cascaded down the channel 154 ready for selective disbursement onto the conveyor chain 180.

The present invention is completed by the introduction of several safety features, only a few of which will be described here. For example, it will be noted that a cover 196 is pivoted about a shaft 198 mounted over the feedbox sub-assembly 16. Easy access to the spring receptacle sub-assembly 18 may be had by simply turning and lifting a knob 200 located on the end of the cover 196. In a similar manner, the feedbox may be covered. It should also be noted that the elastimeric sheet 42 prevents one from inserting their hands into the moving mechanism formed by mounting block 46 and its corresponding components. While other modifications of the present invention will become apparent to those skilled in the art, the invention should be limited only by the appended claims.

I claim:

1. A spring feeding device for delivering a plurality of fixed length, specially adapted wire springs to a desired location at a desired spacing, comprising:
   a feedbox for receiving said plurality of specially adapted springs;
   said feedbox having a general U-shaped and comprised of a plurality of sides, one side of which is opened with two opposite sides and a backside, with said two opposite sides adjacent said opened side spaced apart by a distance slightly greater than said fixed length of said springs to prevent tangling between said springs;
   rigid planar platen means closing said opened side of said U-shaped feedbox said platen means having grooves extending across the face thereof which receive individual springs;
   means for agitating said springs toward said platen grooves; and
   conveyor means for moving said platen means from said opened side and replacing said platen means with a second platen means, whereby said springs are separated into a fixed spacing determined by said grooves and delivered from said feedbox by said platen means.

2. A spring feeding device for delivering springs, as claimed in claim 1, wherein said feedbox comprises:
   four sides and a bottom, three of said four sides being closed while said fourth side is openly retained.

3. A spring feeding device for delivering springs, as claimed in claim 2, wherein said bottom of said feedbox comprises:
   panel means for closing the bottom of said feedbox;
   means for reciprocally mounting said panel means; and
   reciprocal drive means for driving said means for reciprocally mounting said panel means wherein said springs are agitated and pushed by said panel means toward said platen grooves.

4. A spring feeding device for delivering springs, as claimed in claim 3, wherein:
   said panel means is mounted at an angle of less than ninety degrees to the plane of said platen means.

5. A spring feeding device for delivering springs, as claimed in claim 1, wherein:
   said conveyor means for moving said platen means include a continuous drive chain;
   said platen means are pivotally attached to said drive chain; and said platen means include a plurality of platen means which align themselves side by side as they are moved across said opened side of said feedbox.

6. A spring feeding device for delivering springs, as claimed in claim 1, additionally comprising:
said platen means formed from nonmagnetic material;
magnetic means mounted behind said platen means from said opened side of said feedbox to attract said springs into said platen grooves and to release said springs from said grooves after said platen means are moved from said opened side.

7. A spring feeding device for delivering springs, as claimed in claim 1, wherein:
said grooves within said platen means have an opening that is slightly larger than the diameter of said springs with upper side surfaces tapered at an angle to open said grooves to receipt of said springs and lower side surfaces tapered at an angle to close said grooves to retain said springs therein; and
said platen means having a width that is less than said fixed length of said springs.

8. A spring feeding device for delivering springs, as claimed in claim 1, additionally comprising:
said conveyor means for moving said platen means include a continuous drive chain which carries said platen means to a generally horizontal position after said platen means are moved from said feedbox;
means for lifting said springs from said platen means when in said general horizontal position;
spring receptacle means for receiving said lifted springs one upon the other in a single row; and
means for releasing one spring at a time from said spring receptacle means, wherein said springs are delivered to a desired location at a desired spacing.

9. A spring feeding device for delivering springs, as claimed in claim 8, additionally comprising:
second drive chain means arranged below said spring receptacle means to receive said springs as they are released therefrom; and
shear means for removing at least one of said spring ends after said springs are received by said second drive chain means.

10. A spring feeding device for delivering springs, as claimed in claim 8, additionally comprising:
sensing means mounted in said spring receptacle means for sensing a low and high position of said springs within said receptacle.

11. A spring feeding device for delivering a plurality of fixed length, specially adapted wire springs to a desired location at a desired spacing, comprising:
a feedbox for receiving said plurality of specially adapted springs;
said feedbox having a plurality of sides, one of which is openly retained;
a plurality of movable rigid, planar platen means, one of which closes said opened side at all times, said platen means having grooves extending across the face thereof which receive said springs;
conveyor means for moving said platen means including a first platen means from said opened side and replacing of said first platen means with a second platen means;
said conveyor means for moving said platen means further moving said platen means into a generally horizontal position;
means for removing said springs from said platen means while in said generally horizontal position;
spring receptacle means for receiving said removed springs and retaining said springs in a single row;
means for releasing said springs from said spring receptacle means; and
carrier means for receiving said released springs.

12. A spring feeding device for delivering springs, as claimed in claim 11, additionally comprising:
said feedbox having four sides and a bottom, three of said four sides are closed while said fourth side is openly retained.

13. A spring feeding device for delivering springs, as claimed in claim 12, additionally comprising:
means for moving said bottom of said feedbox to urge said springs into said grooves.

14. A spring feeding device for delivering springs, as claimed in claim 11, additionally comprising:
said platen means formed from nonmagnetic material;
magnetic means mounted behind said platen means from said opened side of said feedbox to attract said springs into said grooves and to release said springs from said grooves after said platen means are moved from said opened side.

15. A spring feeding device for delivering springs, as claimed in claim 11, wherein:
said grooves within said platen means have an opening that is slightly larger than the diameter of said springs with upper side surfaces tapered at an angle to open said grooves to receipt of said springs and lower side surfaces tapered at an angle to close said grooves to retain said springs therein; and
said platen means having a width that is less than said fixed length of said springs.

16. A spring feeding device for delivering springs, as claimed in claim 11, additionally comprising:
sensing means mounted in said spring receptacle means for sensing a low and high position of said springs within said receptacle.

17. A spring feeding device for delivering springs, as claimed in claim 11, additionally comprising:
shear means for removing at least one of said spring ends after said spring is released by said means for releasing said spring and received by said carrier means.

* * * * *